United States Patent
Mikashima

(10) Patent No.: US 11,141,971 B2
(45) Date of Patent: Oct. 12, 2021

(54) IMAGE FORMING APPARATUS

(71) Applicant: KYOCERA Document Solutions Inc., Osaka (JP)

(72) Inventor: Katsuo Mikashima, Osaka (JP)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 0 days.

(21) Appl. No.: 16/780,225

(22) Filed: Feb. 3, 2020

(65) Prior Publication Data
US 2020/0247114 A1    Aug. 6, 2020

(30) Foreign Application Priority Data
Feb. 4, 2019  (JP) .............................. JP2019-017572

(51) Int. Cl.
 B41J 2/045   (2006.01)
 B41J 11/00   (2006.01)
 B41J 13/00   (2006.01)

(52) U.S. Cl.
 CPC ....... *B41J 2/04505* (2013.01); *B41J 2/04586* (2013.01); *B41J 11/008* (2013.01); *B41J 11/0095* (2013.01); *B41J 13/0009* (2013.01)

(58) Field of Classification Search
 CPC ............ B41J 2/04505; B41J 2/04586; B41J 13/0009; B41J 11/008; B41J 11/0095; G06T 3/4007; H04N 1/00026; H04N 1/192; H04N 1/00681; H04N 1/00748; H04N 1/3878; H04N 2201/047; H04N 2201/04753; H04N 2201/04789; H04N 2201/04701; H04N 2201/04729;

(Continued)

(56) References Cited

U.S. PATENT DOCUMENTS

2003/0001077 A1   1/2003  Perregaux .................. 250/208.1
2010/0033768 A1*  2/2010  Hamada ............... H04N 1/1917
                                                      358/474

(Continued)

FOREIGN PATENT DOCUMENTS

EP    0 975 143 A2   6/1999
EP    3 335 891 A1  12/2017

(Continued)

OTHER PUBLICATIONS

Partial European Search Report dated May 13, 2020, issued by the European Patent Office in corresponding application JP 20155045.6.

*Primary Examiner* — Yaovi M Ameh
(74) *Attorney, Agent, or Firm* — Stein IP, LLC

(57) ABSTRACT

An image forming apparatus includes a conveyance part, an image forming part, a sheet detection sensor, a sensor unit, and a controller. The sheet detection sensor, in which a plurality of sensor blocks each with a plurality of sensor elements mounted thereon at specified intervals are arrayed in a sheet width direction, detects an edge position in the sheet width direction on a basis of scanning image data formed by reading of the sheet. The controller is enabled to execute a calibration of inserting, into the scanning image data, interpolation pixels for compensating an error between an edge position detected by the scanning image data and an actual edge position.

6 Claims, 9 Drawing Sheets

(58) Field of Classification Search
CPC ........ H04N 1/047; H04N 1/19; H04N 1/1903; H04N 1/191
See application file for complete search history.

(56) References Cited

U.S. PATENT DOCUMENTS

2016/0221778 A1    8/2016  Ueda et al.
2018/0170699 A1*   6/2018  Yamasaki ............ B41J 11/0095

FOREIGN PATENT DOCUMENTS

| JP | 2006-224562 A | 8/2006 |
| JP | 2016-145814 A | 8/2016 |

* cited by examiner

IMAGE FORMING APPARATUS

INCORPORATION BY REFERENCE

This application is based upon and claims the benefit of priority from the corresponding Japanese Patent Application No. 2019-017572 filed on Feb. 4, 2019, the entire contents of which are incorporated herein by reference.

BACKGROUND

The present disclosure relates to an image forming apparatus, such as facsimiles, copiers and printers, equipped with a sheet detection sensor for detecting a widthwise position of a sheet. More specifically, the disclosure relates to a method of correcting detection errors of the sheet detection sensor.

Image forming apparatuses such as facsimiles, copiers and printers, which are designed to record images on a sheet (recording medium) of paper, cloth, OHP sheet or the like, can be classified into ink jet type, wire dot-matrix type, thermal type, or the like according to their recording method. Those of the ink jet recording type can further be classified into serial type ones in which recording is carried out while the recording head is scanning the top of the sheet, and line head type ones in which recording is carried out by recording heads fixed to the apparatus body.

In printing on a sheet with an image forming apparatus, misalignment of the sheet in a direction perpendicular to a sheet conveyance direction (i.e., in a sheet width direction) would cause a print position to be misaligned sheet by sheet. Due to this, in cases where printing is followed by bookbinding or the like, high accuracy is demanded for page-base print position accuracy. Particularly with use of an ink jet recording apparatus, because ink is more likely to penetrate into the recording medium so as to be visible from the other side of the sheet, even higher accuracy (e.g., 0.3 mm or less) is demanded for the print position accuracy in double-sided printing mode.

Under these circumstances, in a conventional image forming apparatus, a CIS (Contact image Sensor) for detecting widthwise-end positions of a sheet is provided on a conveyance belt that conveys the sheet. In this case, the image forming apparatus detects a widthwise-end position of a sheet on a basis of intensity differences of light received by the CIS due to presence or absence of the sheet. For example, there has been known an edge detector, in which output values of a CIS provided on a conveyance path for the conveyance object (sheet) are binarized, and when a position where a binarized value has changed over falls within one of edge detection ranges that have been stored on a size basis of the conveyance object, it is determined that an edge position of the conveyance object has been detected.

Also conventionally known is a print system which includes: image data storage means for storing double-sided printing image data including top-surface image data and back-surface image data; top-surface image position detection means for detecting a top-surface image position that is a position of an image portion of top-surface image data relative to an image formation-enabled range; back-surface image position detection means for detecting a back-surface image position that is a position of an image portion of back-surface image data relative to the image formation-enabled range; image position adjustment means for adjusting at least one of top-surface image data and back-surface image data so that a top-surface image position and a back-surface image position become identical with each other; and an image forming apparatus for forming a top-surface image and a back-surface image based on image positions adjusted by the image position adjustment means.

SUMMARY

An image forming apparatus according to one aspect of the present disclosure includes a conveyance part, an image forming part, a sheet detection sensor, a sensor unit, and a controller. The conveyance part conveys a sheet. The image forming part, on a basis of print data, forms an image on the sheet conveyed by the conveyance part. The sheet detection sensor is placed on an upstream side of the image forming part in a sheet conveyance direction and, on a basis of scanning image data formed by reading of the sheet, detects an edge position of the sheet in a sheet width direction perpendicular to the sheet conveyance direction. The sensor unit includes the sheet detection sensor. The controller adjusts an image formation position on the sheet formed by the image forming part on a basis of a difference in the width direction between the edge position detected by the sheet detection sensor and a predetermined reference position. The sheet detection sensor is configured that a plurality of sensor blocks each with a predetermined reading resolution and with a plurality of sensor elements mounted thereon at specified intervals are arrayed in the sheet width direction. The controller is enabled to execute a calibration which corrects an error in the sheet detection sensor caused by variations of intervals of the sensor elements at border portions between the plurality of the sensor blocks by inserting interpolation pixels into the scanning image data.

Still further objects of the disclosure as well as concrete advantages obtained by the disclosure will become more apparent from the description of an embodiment given below.

DETAILED DESCRIPTION

Figure 1:
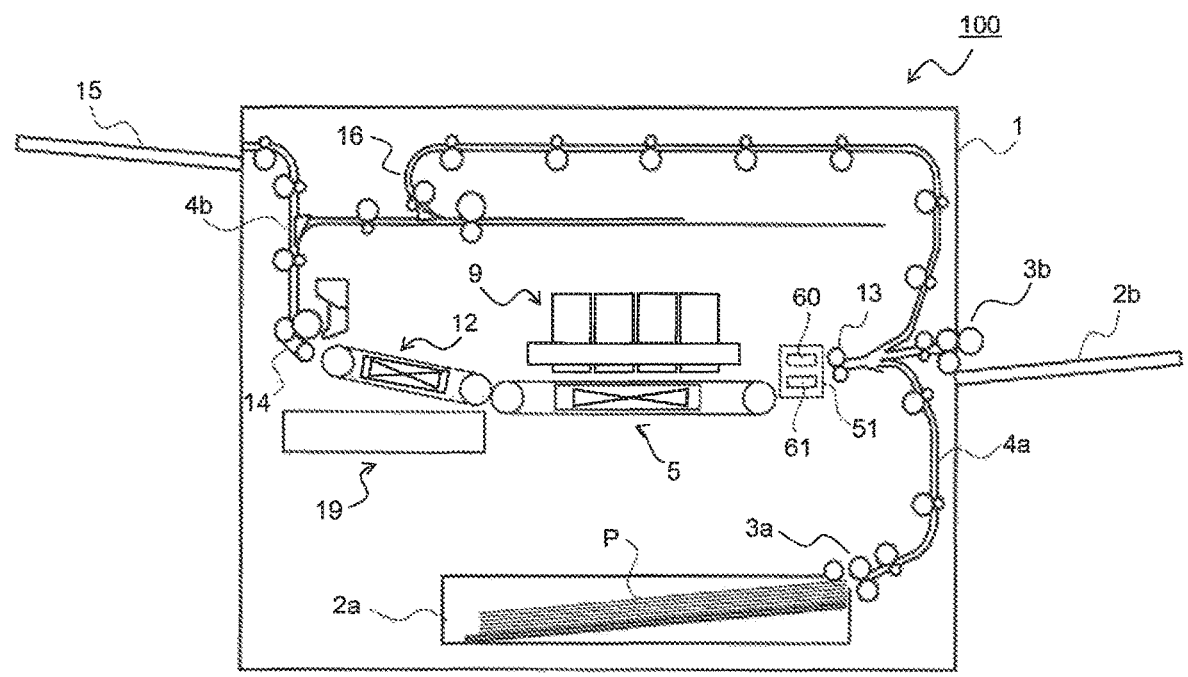
FIG. 1 is a side sectional view showing a schematic structure of a printer according to one embodiment of the disclosure.
Figure 2:
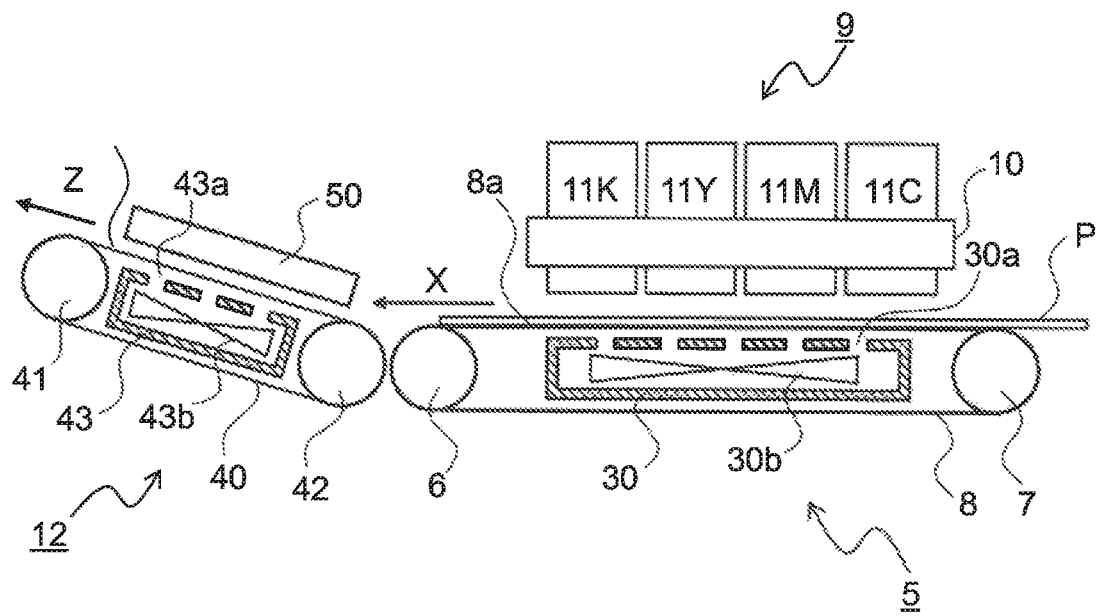
FIG. 2 is a side sectional view showing a structure of around a first belt conveyance part, a recording part, and a second belt conveyance part in the printer of this embodiment.
Figure 3:
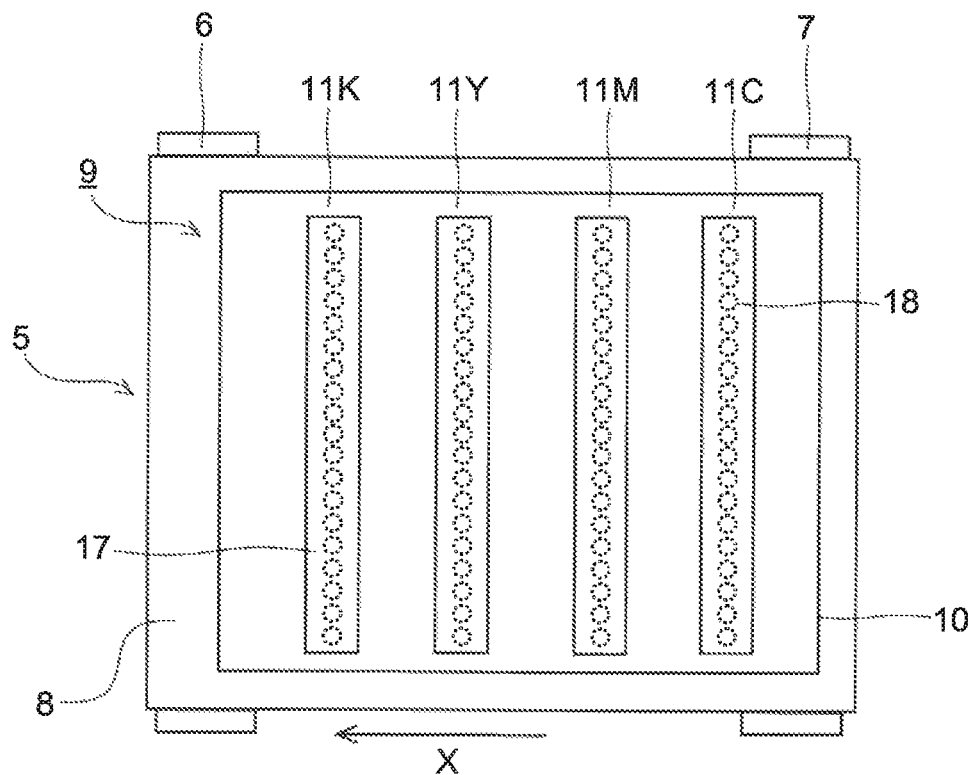
FIG. 3 is a plan view of the first belt conveyance part and the recording part in the printer of this embodiment, as viewed from above.

Hereinbelow, an embodiment of the present disclosure will be described with reference to the accompanying drawings. FIG. 1 is a view showing a schematic structure of a printer 100 of the ink jet recording type. FIG. 2 is a sectional view showing a structure of around a first belt conveyance part 5, a recording part 9, and a second belt conveyance part 12 in the printer 100 of FIG. 1. FIG. 3 is a plan view of the first belt conveyance part 5 and the recording part 9 in the printer 100 of FIG. 1, as viewed from above.

In the printer 100, as shown in FIG. 1, a sheet feed cassette 2a serving as a sheet container part is placed below inside the printer body 100. A manual sheet feed tray 2b is provided outside a right side face of the printer body 1. A sheet feed device 3a is placed on a sheet-conveyance downstream side of the sheet feed cassette 2a, i.e., on an upper right side of the sheet feed cassette 2a in FIG. 1. Also, a sheet feed device 3b is placed on a sheet-conveyance downstream side of the manual sheet feed tray 2b, i.e., on a left side of the manual sheet feed tray 2b in FIG. 1. By these sheet feed devices 3a, 3b, sheets P are fed out separately one by one.

A first sheet conveyance path 4a is provided inside the printer 100. The first sheet conveyance path 4a is located on an upper right of the sheet feed cassette 2a as well as on a left side of the manual sheet feed tray 2b. A sheet P fed out from the sheet feed cassette 2a is conveyed vertically upward through the first sheet conveyance path 4a and along a side face of the printer body 1. A sheet fed out from the manual sheet feed tray 2b is conveyed generally horizontally leftward through the first sheet conveyance path 4a.

A registration roller pair 13 is provided at a sheet-conveyance downstream end of the first sheet conveyance path 4a. Further, a first belt conveyance part 5 and a recording part 9 are placed in downstream-side close proximity to the registration roller pair 13. The registration roller pair 13, while correcting any skewed feed of the sheet P and moreover measuring a timing for an ink ejection operation to be performed by the recording part 9, feeds out the sheet P toward the first belt conveyance part 5.

A sensor unit 51 for detecting end positions of the sheet P in its widthwise direction (i.e., a direction perpendicular to the sheet conveyance direction) is also placed between the registration roller pair 13 and the first belt conveyance part 5. A CIS 60 and an LED 61 are placed in the sensor unit 51. A detailed structure of around the CIS 60 and the LED 61 will be described later.

The first belt conveyance part 5 is equipped with an endless first conveyor belt 8 (see FIG. 2) wound on a first driving roller 6 and a first driven roller 7. The sheet P fed out from the registration roller pair 13 passes through under the recording part 9 while remaining sucked and held on a conveyance surface 8a of the first conveyor belt 8. The CIS 60 corresponds to a sheet detection sensor, and the LED 61 corresponds to a light source part.

A first sheet suction part 30 is provided at a site being inside the first conveyor belt 8 and facing the back side of the conveyance surface 8a of the first conveyor belt 8. The first sheet suction part 30 has a multiplicity of air-suction holes 30a provided in its top face. The first sheet suction part 30 also has a fan 30b provided inside, being enabled to suck air downward from the top face. The first conveyor belt 8 as well is provided with a multiplicity of air-suction vent holes 8b (see FIG. 5). With the above-described structure, the first belt conveyance part 5 conveys the sheet P while keeping the sheet P sucked and held on the conveyance surface 8a of the first conveyor belt 8.

The recording part 9 is equipped with line heads 11C, 11M, 11Y, 11K to record images on the sheet P which is conveyed while being sucked and held on the conveyance surface 8a of the first conveyor belt 8. In correspondence to image-data information received from an external computer or the like, individual kinds of inks are ejected successively from the line heads 11C to 11K, respectively, toward the sheet P sucked to the first conveyor belt 8. As a result of this, a full-color image in which four-color inks of cyan, magenta, yellow and black are superimposed on one another is recorded on the sheet P. In addition, the printer 100 is also capable of recording monochrome images.

The recording part 9, as shown in FIG. 3, includes a head housing 10 as well as the line heads 11C, 11M, 11Y, 11K held on the head housing 10. These line heads 11C to 11K, each having a recording area measuring more than the width of the sheet P to be conveyed, are supported at such a height that a specified gap (e.g., 1 mm) is formed against the conveyance surface 8a of the first conveyor belt 8. The line heads 11C to 11K are so configured that recording heads 17 are juxtaposed along a sheet width direction (up/down direction in FIG. 3) perpendicular to the sheet conveyance direction. A multiplicity of ink ejection nozzles 18 are arrayed on ink ejection surfaces of the recording heads 17, respectively.

Four-color (cyan, magenta, yellow and black) inks stored in their respective ink tanks (not shown) are supplied to the recording heads 17, which constitute the line heads 11C to 11K, respectively, on a color basis of the line heads 11C to 11K In response to image data received from the external computer or the like, each of the recording heads 17 ejects ink through ink ejection nozzles 18 corresponding to print positions toward the sheet P being conveyed as it is sucked and held on the conveyance surface 8a of the first conveyor belt 8. As a result of this, a color image in which four-color inks of cyan, magenta, yellow and black are superimposed on one another is formed on the sheet P lying on the first conveyor belt 8.

A second belt conveyance part 12 is placed on the sheet-conveyance downstream side (left side in FIG. 1) of the first belt conveyance part 5. The sheet P, on which an image has been recorded in the recording part 9, is fed to the second belt conveyance part 12, where ink ejected onto the surface of the sheet P is dried during the passage through the second belt conveyance part 12.

The second belt conveyance part 12 is equipped with an endless second conveyor belt 40 wound on a second driving roller 41 and a second driven roller 42. The second conveyor belt 40 is rotated counterclockwise, as viewed in FIG. 2, by the second driving roller 41. The sheet P, on which an image has been recorded in the recording part 9 and which has been conveyed in an arrow X direction by the first belt conveyance part 5, is delivered to the second conveyor belt 40 and conveyed in an arrow Z direction of FIG. 2.

A second sheet suction part 43 is provided at a site being inside the second conveyor belt 40 and facing the back side of the conveyance surface 40a of the second conveyor belt 40. The second sheet suction part 43 has a multiplicity of air-suction holes 43a provided in its top face. The second sheet suction part 43 also has a fan 43b provided inside, being enabled to suck air downward from the top face. The second conveyor belt 40 as well is provided with a multiplicity of air-suction vent holes (not shown). With the above-described structure, the second belt conveyance part 12 conveys the sheet P while keeping the sheet P sucked and held on the conveyance surface 40a of the second conveyor belt 40.

Further, a conveyance guide part 50 is provided at a position facing the conveyance surface 40a of the second conveyor belt 40. The conveyance guide part 50 makes up a sheet conveyance path in combination with the conveyance surface 40a of the second conveyor belt 40. functioning to suppress warps and flaps of the sheet P sucked and held on the conveyance surface 40a by the second sheet suction part 43.

A decurler part 14 is provided in proximity to a left side face of the printer body 1 on the sheet-conveyance downstream side of the second belt conveyance part 12. The sheet P with ink dried in the second belt conveyance part 12 is fed to the decurler part 14, where any curls having occurred to the sheet P are corrected.

A second sheet conveyance path 4b is provided on the sheet-conveyance downstream side (upper side in FIG. 1) of the decurler part 14. In a case where no double-sided recording is executed, the sheet P having passed through the deader part 14 is discharged from the second sheet conveyance path 4b via a discharge roller pair onto a sheet discharge tray 15 provided outside the left side face of the printer 100. In another case where double-sided recording on the sheet P is executed, the sheet P having completely been subjected to one-side recording and passed through the second belt conveyance part 12 and the decurler part 14 is conveyed through the second sheet conveyance path 4b onto a reversal conveyance path 16. The sheet P having been fed to the reversal conveyance path 16 is changed over in conveyance direction to reverse its top/back side, then being conveyed through upper part of the printer 100 to the registration roller pair 13. Thereafter, the sheet P, with its non-image-recorded surface facing upward, is conveyed once again to the first belt conveyance part 5.

A maintenance unit 19 is placed under the second belt conveyance part 12. For execution of maintenance of the recording heads 17, the maintenance unit 19 is moved to under the recording part 9 to wipe off ink ejected (purged) from the ink ejection nozzles 18 (see FIG. 3) of the recording heads 17, thus serving for collection of wiped-off ink.

Figure 4:
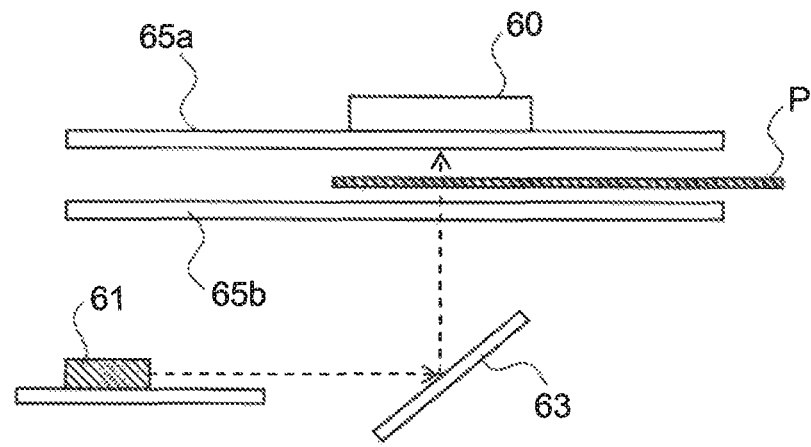
FIG. 4 is a side view of around a CIS and an LED in the printer of this embodiment.
Figure 5:
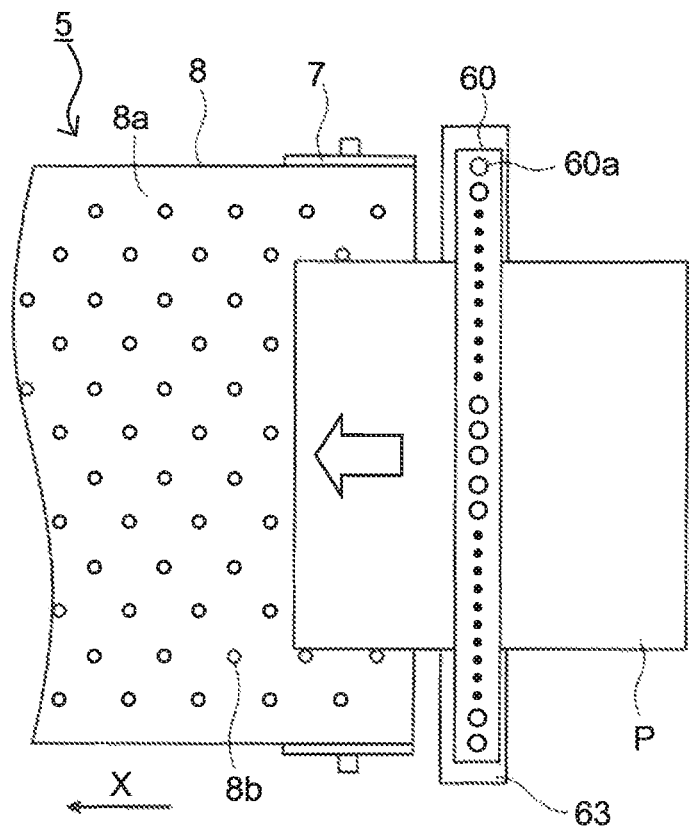
FIG. 5 is a plan view showing a structure of around the CIS and the first belt conveyance part in the printer of this embodiment.

Next, a detailed structure of around the CIS 60 and the LED 61 will be described. FIG. 4 is a side view of around the CIS 60 and the LED 61 in the printer 100 of this embodiment. FIG. 5 is a plan view showing a structure of around the CIS 60 and the first belt conveyance part 5 in the printer 100 of this embodiment. The CIS 60 is placed on the sheet conveyance upstream side of the first belt conveyance part 5, and the LED 61 is placed under the CIS 60. Also, a reflecting plate 63 for reflecting light emitted from the LED 61 to guide the reflected light toward the CIS 60 is placed just under the CIS 60.

As shown in FIG. 4, two contact glasses 65a, 65b are placed opposite to each other just under the CIS 60. Then, a lower surface of the contact glass 65a and an upper surface of the contact glass 65b form part of the sheet conveyance path.

In the CIS 60, as shown in FIG. 5, a multiplicity of sensor elements 60a formed of photoelectric conversion elements are arranged in the sheet width direction (up/down direction in FIG. 5). Then, the CIS 60 detects a position of a widthwise end of the sheet P on a basis of an intensity difference between one portion of the sensor elements 60a on which reflected light from the reflecting plate 63 becomes incident directly and another portion of the sensor elements 60a where reflected light from the reflecting plate 63 is blocked by the sheet P.

Figure 6:
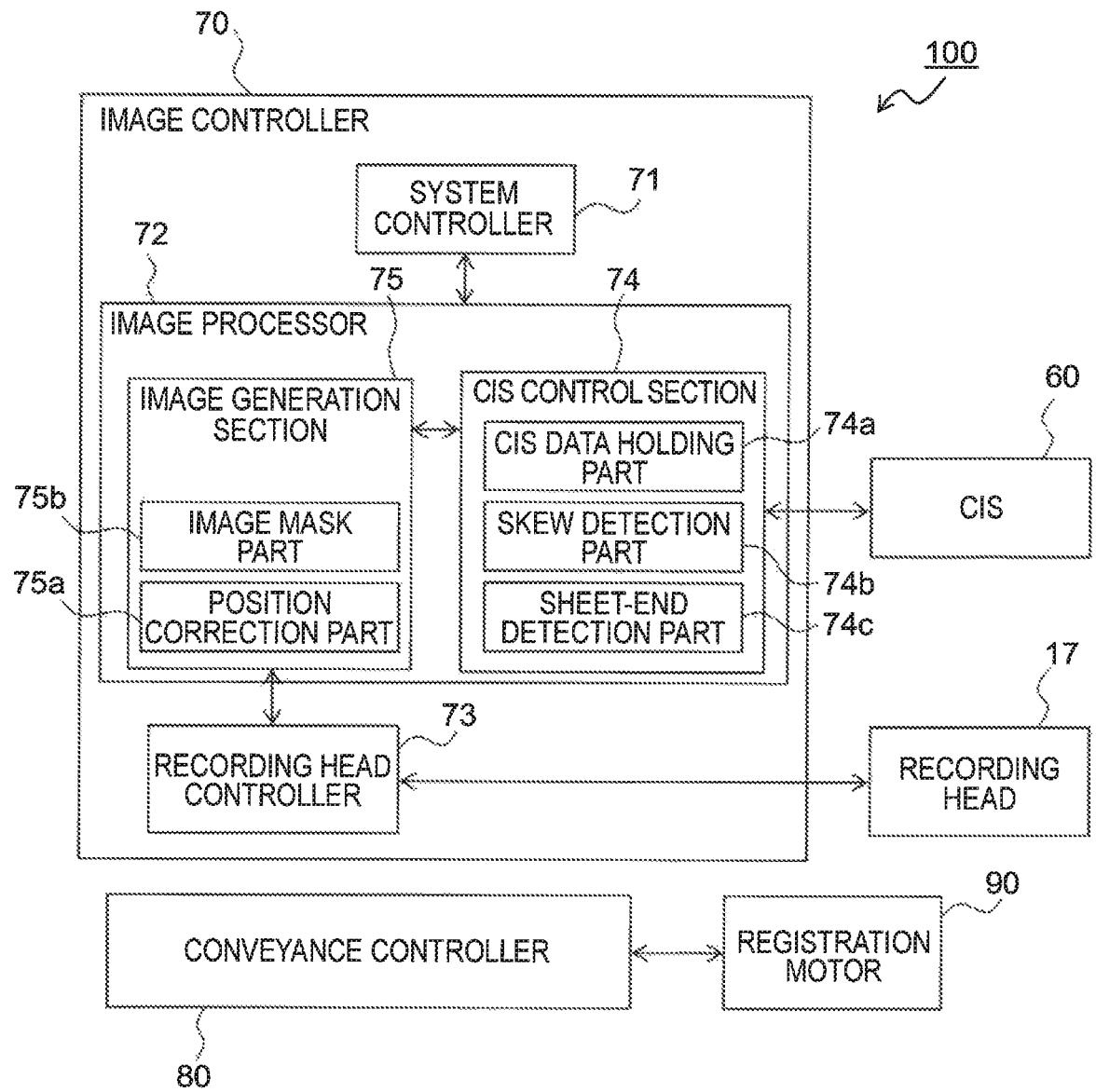
FIG. 6 is a block diagram showing control paths of nozzle-ejection-position correction control in the printer of this embodiment.

FIG. 6 is a block diagram showing control paths in the printer 100 of this embodiment. The printer 100 includes an image controller 70 for performing image formation control over image formation on the sheet P by the recording part 9, and a conveyance controller 80 for performing conveyance control over the sheet P. The image controller 70 includes a system controller 71, an image processor 72, and a recording head controller 73. The system, controller 71 integrally controls the whole image controller 70. In addition, the system controller 71 may also serve as a main CPU of the printer 100 enabled to simultaneously perform other control related to the printer 100. That is, the system controller 71 may also be designed to perform image formation control as part of the main CPU's function of the printer 100. When a print operation onto the sheet P by the printer 100 is started, the system controller 71 performs various types of settings for a CIS control section 74 to read signals from the CIS 60.

The image processor 72 includes the CIS control section 74 and an image generation section 75. In accordance with contents set by the system controller 71, the CIS control section 74 transmits, to the CIS 60, a reference clock signal for reading signals from the CIS 60 as well as an accumulation-time determination signal for determining a charge accumulation time in the CIS 60. Also, with respect to each of output signals outputted by the CIS 60, the CIS control section 74 checks, on a single-pixel basis, 0/1 values of digital signals that have been binarized in a binarization circuit. Thus, the CIS control section 74 detects positions of pixels (positions of photoelectric conversion elements) in the sensor elements 60a where the value of the digital signal is changed over from 0 to 1 or from 1 to 0.

The CIS control selection 74 includes a CIS data holding part 74a, a skew detection part 74b, and a sheet-end detection part 74c. The CIS data holding part 74a stores therein image data, which are output signals (voltage values based on electric charges) outputted by the CIS 60, as shaded image data (scanning image dada). The skew detection part 74b calculates a skew angle of the sheet P on a basis of a timing difference in the sheet width direction at a time point when a forward end of the sheet P passes through the CIS 60. The sheet-end detection part 74c detects, as a widthwise end (edge position) of the sheet P, a sheet-widthwise position of a pixel where an output signal outputted by the CIS 60 has been changed over.

The image generation section 75 includes a position correction part 75a and an image mask part 75b. The position correction part 75a corrects an image formation position for the sheet P on a basis of a skew of the sheet P and its widthwise-end information detected by the CIS control section 74. The image mask part 75b cuts portions of a print image overlapping with outer areas of the sheet P to prevent any contamination of the first conveyor belt 8 due to ink ejection onto the outer areas of the sheet P.

The recording head controller 73 determines a working area of the ink ejection nozzles 18 of the recording heads 17 on a basis of image position information transmitted from the image generation section 75.

At a timing when the sheet P in a standby state is conveyed toward the recording part 9 by the registration roller pair 13 (see FIG. 1), a control signal is transmitted from the conveyance controller 80 to a registration motor 90, causing the registration roller pair 13 to start rotation. The system controller 71 instructs the CIS control section 74 to start skew and edge detection of the sheet P. The CIS control section 74, having received a start instruction for skew and edge detection from the system controller 71, makes the LED 61 lit for a certain period in synchronization with the accumulation-time determination signal.

The CIS 60 outputs voltages equivalent to light quantities accumulated at the sensor elements 60a (photoelectric conversion elements) under the lit state of the LED 61, as output signals on a pixel-by-pixel basis, by means of the next accumulation-time determination signal and reference dock signal. The output signals outputted by the CIS 60 are binarized each by comparison with a comparison reference voltage (threshold voltage), and inputted to the CIS control section 74 as digital signals.

Upon detection of positions of pixels, out of the sensor elements 60a (pixels) of the CIS 60, where the digital signal value has been changed over by passage of the sheet P, the skew detection part 74b calculates a skew angle of the sheet P on the basis of a timing difference in the sheet width direction resulting when the forward end of the sheet P passes through the CIS 60. Also, the sheet-end detection part 74c detects a widthwise edge position of the sheet P on a basis of positions of pixels that have been changed in signal value. The CIS control section 74 calculates a difference quantity between an edge position detected by the sheet-end detection part 74c and an edge position (reference edge position) resulting when the sheet P is conveyed at such an ideal conveyance position (reference conveyance position) that the sheet P passes through a center position of a sheet passage area. The calculated skew angle and widthwise difference quantity are transmitted to the recording head controller 73. The recording head controller 73 shifts the working area of the ink ejection nozzles 18 in the recording heads 17 in response to the transmitted skew angle and widthwise difference quantity of the sheet P.

Figure 7:
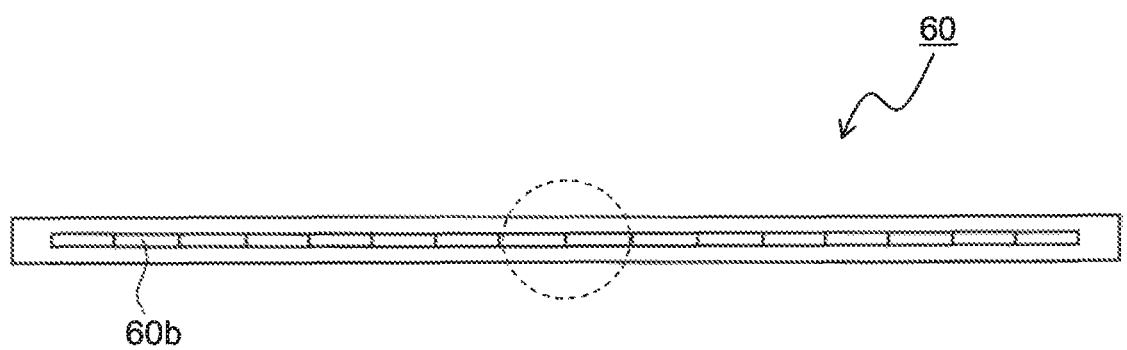
FIG. 7 is a plan view of the CIS.
Figure 8:
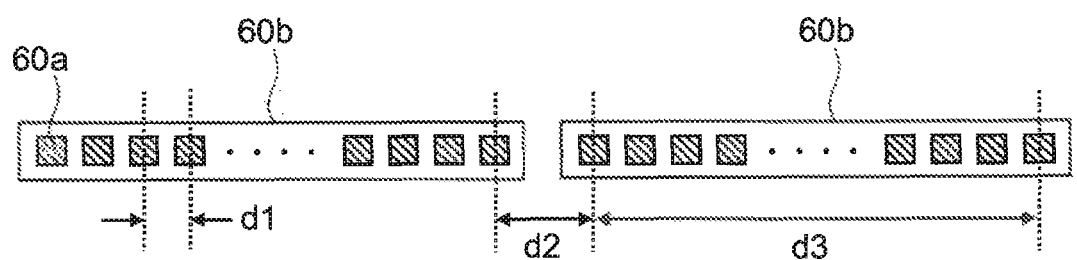
FIG. 8 is an enlarged view of a border portion between sensor blocks making up the CIS.

FIG. 7 is a plan view of the CIS 60 to be used in the printer 100 of this embodiment. FIG. 8 is an enlarged view of a portion (encircled by broken line in FIG. 7) of the CIS 60. The CIS 60 is so formed that sensor blocks 60b with a multiplicity of sensor elements 60a mounted thereon are arrayed in one line to a multiplicity (herein 16 pcs.) along a main scanning direction (sheet width direction, i.e., right/left direction in FIG. 7). The CIS 60 has such a length in the main scanning direction that a sheet P of the A3 portrait size (sheet width 297 mm) is allowed to pass through sensor blocks 60b placed at both end portions in the main scanning direction.

In one sensor block 60b, as shown in FIG. 8, a plurality (herein 234 pcs.) of sensor elements 60a are arrayed at constant intervals d1. With a resolution of 600 dpi as an example, it follows that d1=600 dpi (42 μm). Meanwhile, an interval d2 of sensor elements 60a between neighboring sensor blocks 60b is larger than d1. That is, between neighboring sensor blocks 60b, there arises an error in position of the sensor elements 60a by (d2-d1). This error is cumulated to increase larger and larger as the distance between sensor blocks 60b placed within the CIS 60 becomes larger and larger toward both end portions of the CIS 60.

Figure 9:
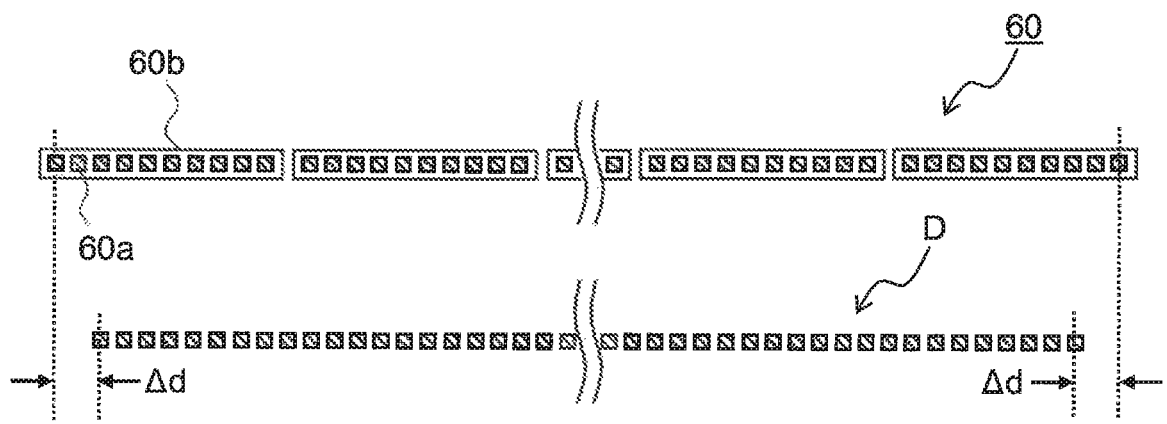
FIG. 9 is a view of a comparison between arrangement of the sensor blocks in the CIS and shaded image data read by the CIS.

FIG. 9 is a view of a comparison between arrangement of the sensor blocks 60b in the CIS 60 and shaded image data D read by the CIS 60. The CIS 60 outputs shaded image data D on an assumption that every interval between the sensor elements 60a is d1. That is, since image data of border portions between the sensor blocks 60b of the CIS 60 are outputted with sensor-block intervals made smaller than actual, it follows that with a center in the main scanning direction regarded as a reference position, there arise errors Δd between widthwise both-side edge positions of the sheet P in the shaded image data D and actual edge positions of the sheet P, respectively. For example, assuming that d2=100 μm in FIG. 8, since fifteen intervals exist between sixteen sensor blocks 60b, a result with the sensor blocks 60b most distant from each other in the main scanning direction within the CIS 60 (i.e., sensor blocks 60b at left-and-right both ends in FIG. 9) is that there arises an error of (100 μm-42μm)× 15=0.87 mm (=2Δd) between an edge position of the shaded image data D and an actual edge position of the sheet P.

Consequently, for example, in a case where a sheet P of the A3 portrait size (sheet width 297 mm) is passed through and its widthwise edge position (widthwise size) is detected by the CIS 60, a detection result would be shorter to an error extent of the interval of the sensor elements 60a, calculating that 297−0.87=296.13 mm.

In cases where the CIS 60 is used in a reading device for document images, errors of such a level as described above (about 0.3%) are indiscernible and so no problematic. However, such errors largely matter when an edge position (widthwise size) of the sheet P is detected with an aim of aligning images relative to the sheet P or preventing ink ejection into outer areas of the sheet P.

Therefore, in this embodiment, it is made implementable to execute a calibration in which pseudo pixels (hereinafter, referred to as interpolation pixels) that compensate differences in intervals of the sensor elements 60a at borders between the sensor blocks 60b are inserted into shaded image data read by the CIS 60 in order to reduce the errors between a widthwise size of the sheet P detected by the CIS 60 and its actual size.

Figure 10:
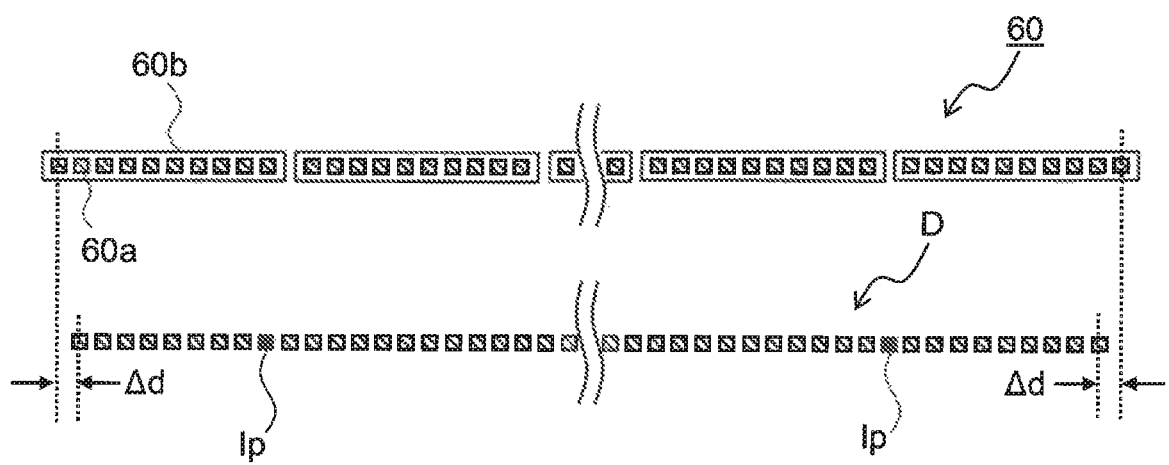
FIG. 10 is a view of a comparison between arrangement of the sensor blocks in the CIS and shaded image data with interpolation pixels added.

FIG. 10 is a view of a comparison between arrangement of the sensor blocks 60b in the CIS 60 and shaded image data D with interpolation pixels Ip added. Insertion of the interpolation pixels Ip makes it possible to reduce the error Δd between an edge position of the sheet P in the shaded image data D and an actual edge position of the sheet P.

In this connection, the distance d2 of neighboring sensor elements 60a at border portions of the sensor blocks 60b is not constant but variable over a range of about 60 μm to 100 μm. It is therefore necessary to adjust the count of interpolation pixels Ip to be inserted in response to variations of the distance d2. Techniques for adjusting the insertion count of the interpolation pixels Ip will be described below.

Figure 11:
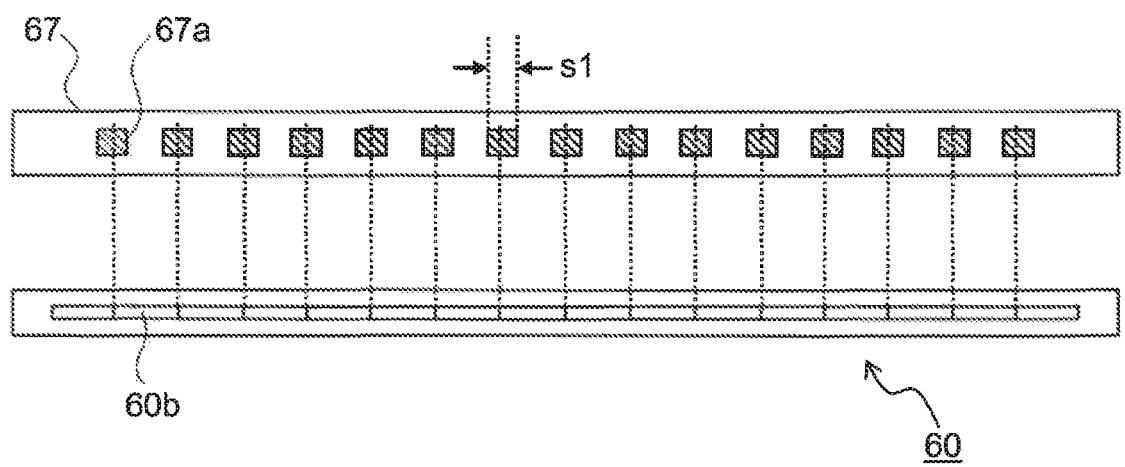
FIG. 11 is a plan view showing a relationship between the CIS and a light-shield plate.

First, a first method of adjusting the pixel count of interpolation pixels Ip by using a light-shield plate 67 is explained. FIG. 11 is a plan view showing a relationship between the CIS 60 and the light-shield plate 67. The light-shield plate 67, which is a transparent flat plate generally equal in length to the CIS 60, has a plurality of light-shield portions 67a formed at positions in the CIS 60 facing border portions of the sensor blocks 60b. The light-shield portions 67a each shield light transmitted by the light-shield plate 67 to an extent of a specified length s1.

With the above-described light-shield plate 67 placed between the CIS 60 and the LED 61, the LED 61 is lit, and reading process by the CIS 60 is executed. Then, how many pixels (sensor elements 60a) in read data have been shielded by the light-shield portions 67a is calculated. Thus, an error in distance between sensor elements 60a at border portions of the sensor blocks 60b from their actual interval can be calculated.

More specifically, since the intervals between the sensor elements 60a are larger at border portions of the sensor blocks 60b, the count of pixels (count of sensor elements 60a) shielded by the light-shield portions 67a at the border portions of the sensor blocks 60b is smaller than the count of pixels shielded by the light-shield portions 67a within one identical sensor block 60b. For example, in a case where the count of pixels (count of sensor elements 60a) shielded by one light-shield portion 67a in one identical sensor block 60b is three pixels, and where the count of pixels shielded by one light-shield portion 67a at a border portion of two sensor blocks 60b is two pixels, a resultant error is 3−2=1 pixel.

Differences in count of pixels at border portions of the sensor blocks 60b calculated as described above are cumulated from the center of the CIS 60 toward its both end portions, respectively. Then, each time the count of cumulated pixels is incremented by one pixel, one interpolation pixel Ip is inserted between sensor blocks 60b. Specifically, when the error in the count of pixels at a first border portion is 0.5 pixels and the error in the count of pixels at a second border portion is 0.5 pixels, one interpolation pixel Ip is inserted at the second border portion. When the error in the count of pixels at a first border portion is 0.5 pixels and the error in the count of pixels at a second border portion is 1.5 pixels, two interpolation pixels Ip are inserted at the second border portion. When the error in the count of pixels at a first border portion is 0.5 pixels, the error in the count of pixels at a second border portion is 0 pixels. and the error in the count of pixels at a third border portion is 0.5 pixels, one interpolation pixel Ip is inserted at the third border portion. In this way, by detecting an error from an actual interval at each border portion of the sensor blocks 60b, sites at which the interpolation pixels Ip are to be inserted during the execution of the calibration can be determined with high precision.

However, the technique of determining the insertion count of interpolation pixels Ip and their insertion sites by using such a light-shield plate 67 as shown in FIG. 11, although effective for calibration during manufacture and shipping of the printer 100, encounters difficulty in adjustment during the calibration in maintenance by servicemen. Thus, there arises a need for a method of adjusting the pixel count of interpolation pixels Ip without using the light-shield plate 67.

Next, a second method of adjusting the pixel count of interpolation pixels Ip is explained. In the second method, reading of a sheet P is executed by the CIS 60 with interpolation pixels Ip inserted at a constant ratio, by which shaded image data is acquired. Then, errors from the actual width of the sheet P are measured.

In this case, since the sheet P has dimensional tolerances of about ±1 mm, there arises a need for measuring the actual sheet width. However, it is quite difficult to execute pm-base measurements for determination of the pixel count of interpolation pixels Ip. Therefore, such a method as shown in FIGS. 12 and 13 is employed.

Figure 12:
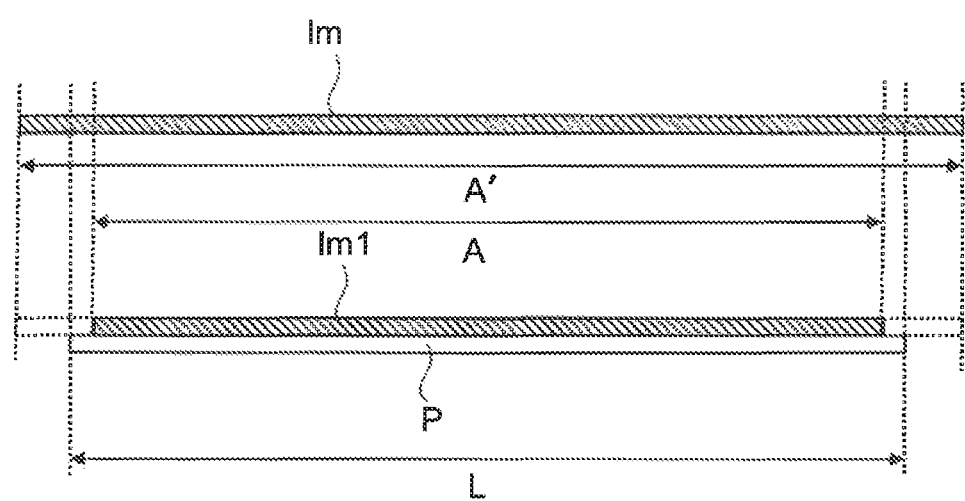
FIG. 12 is a sectional view of a state in which a first corrected image of an image width A has been printed, as viewed in a sheet conveyance direction, where the first corrected image is obtained by cutting portions of a reference image of an image width A' overlapping with outer areas of the sheet.

FIG. 12 is a sectional view of a state in which a first corrected image Im1 having an image width A has been printed, as viewed in the sheet conveyance direction, where with use of a reference image Im (solid image) having an image width A'(A<A') larger than a width L of the sheet P, the first corrected image Im1 is obtained by cutting portions of the reference image Im overlapping with outer areas of the sheet P on a basis of shaded image data acquired by the CIS 60. FIG. 13 is a plan view of a state in which the first corrected image Im1 has been printed on the sheet P, as viewed from above.

Figure 13:
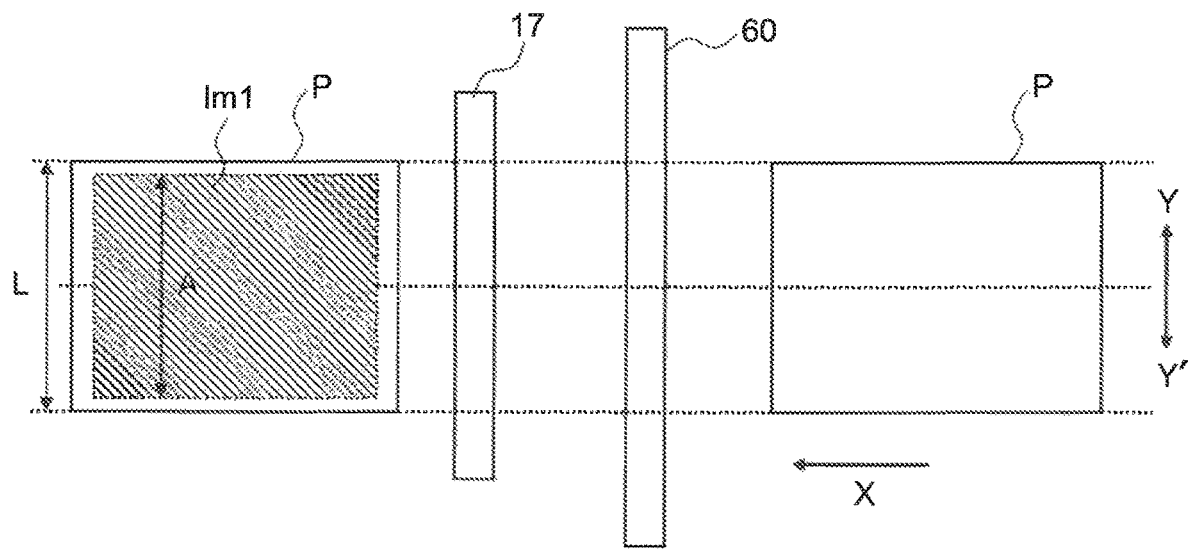
FIG. 13 is a plan view of a state in which the first corrected image has been printed on the sheet, as viewed from above.

In FIGS. 12 and 13, a condition that a margin (L-A) resulting from printing of the first corrected image Im1 on the sheet P is 0 proves that shaded image data acquired by the CIS 60 is consistent with the actual sheet width L, and that the pixel count of interpolation pixels Ip has been an optimum one. With any margin other than 0, insertion of interpolation pixels Ip is continued until the margin becomes 0. Executing the above-described procedure with sheets P of plural sizes makes it possible to further optimize the pixel count of interpolation pixels 1p to be inserted between the sensor blocks 60b.

With the method shown in FIGS. 12 and 13, however, when the pixel count of previously inserted interpolation pixels Ip has been larger than an optimum count, it results that A>L, where the margin could be mistaken as having become 0 (A=L). Moreover, there is another problem that the first corrected image Im1 may be printed even in outer areas of the sheet P, causing interior of the printer 100 to be contaminated. Thus, such a technique as shown in FIGS. 14 and 15 is employed.

Figure 14:
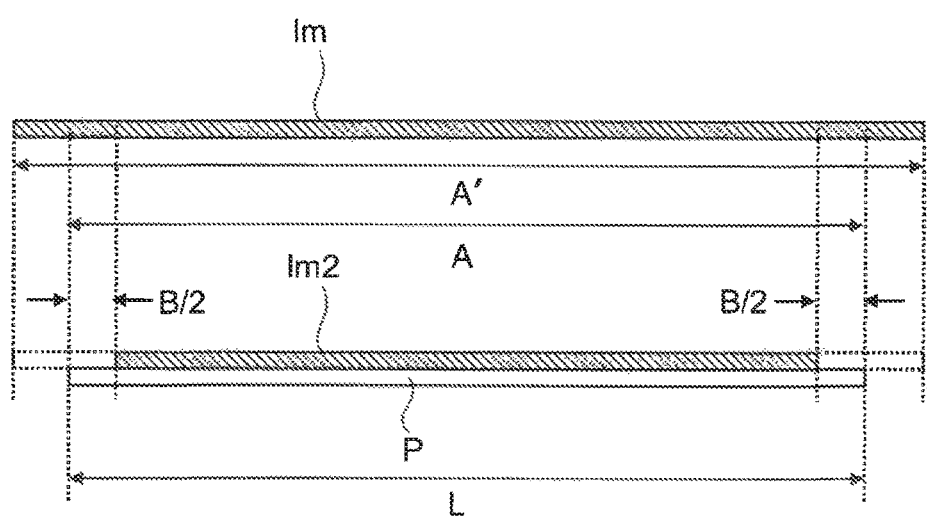
FIG. 14 is a sectional view of a state in which a second corrected image of an image width A-B has been printed, as viewed in the sheet conveyance direction, where the second corrected image is obtained by cutting portions of the reference image of the image width A' overlapping with outer areas of the sheet and further cutting the image so that its width becomes smaller than a width L of the sheet by a distance B.
Figure 15:
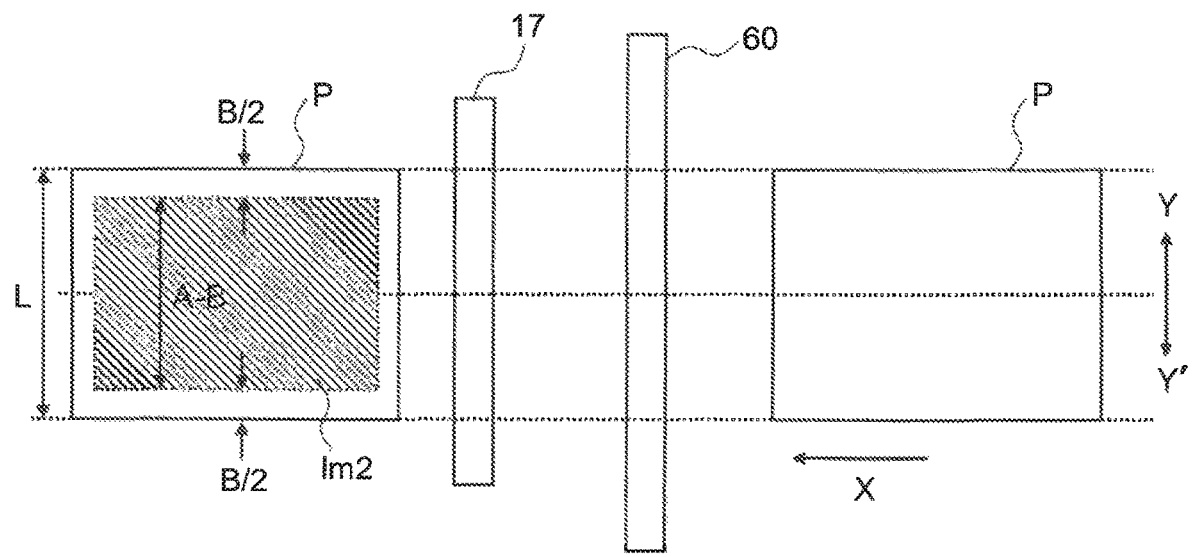
FIG. 15 is a plan view of a state in which the second corrected image has been printed on the sheet, as viewed from above.

FIG. 14 is a sectional view of a state in which a second corrected image Im2 having an image width A-B has been printed, as viewed in the sheet conveyance direction, where with use of a reference image Im having an image width A' larger than the width L of the sheet P, the second corrected image Im2 is obtained by cutting portions of the reference image Im overlapping with widthwise outer areas of the sheet P on a basis of shaded image data acquired by the CIS 60 and further cutting the image so that its width becomes smaller than the width L of the sheet P by a distance B. FIG. 15 is a plan view of a state in which the second corrected image Im2 has been printed on the sheet P, as viewed from above. The distance B is set larger than a difference (A'-L) between the image width A' of the reference image Im and the width L of the sheet P (B>A'-L) and smaller than a distance (d3 in FIG. 8) between pixels (sensor elements 60a) of both end portions of the sensor blocks 60b.

Consequently, since the distance B is smaller than a length of one sensor block 60b, a margin {L-(A-B)} resulting from printing of the second corrected image Im2 on the sheet P is free from any influence of the border portions of the sensor blocks 60b. With no considerations given to conveyance misalignment of the sheet P relative to the main scanning direction, since an optimum pixel count of inserted interpolation pixels Ip entails a margin of B/2, whether or not a pixel count of the interpolation pixels Ip is an optimum one can be determined by measuring, with a ruler or the like, whether the margin has come to B/2. Work of the determination is facilitated by setting the value of B/2 to an easy-to-measure length for rulers, such as 10 mm.

With B>A'-L satisfied, even when the pixel count of inserted interpolation pixels Ip has become larger than an optimum value such that A>L, it always holds that the margin {L-(A-B)} is larger than 0. Accordingly, there is no possibility that outer areas of the sheet P may be printed to make the interior of the printer 100 contaminated. With B/2 larger than a specified value (=10 mm), insertion of interpolation pixels Ip and printing of the second corrected image Im2 are continued until B/2 comes to the specified value. In this case, in terms of reducing the number of printing repetitions, it is preferable to print, on one sheet P, a second corrected image Im2 of plural stages corresponding to changed pixel counts of the interpolation pixels Ip.

Figure 16:
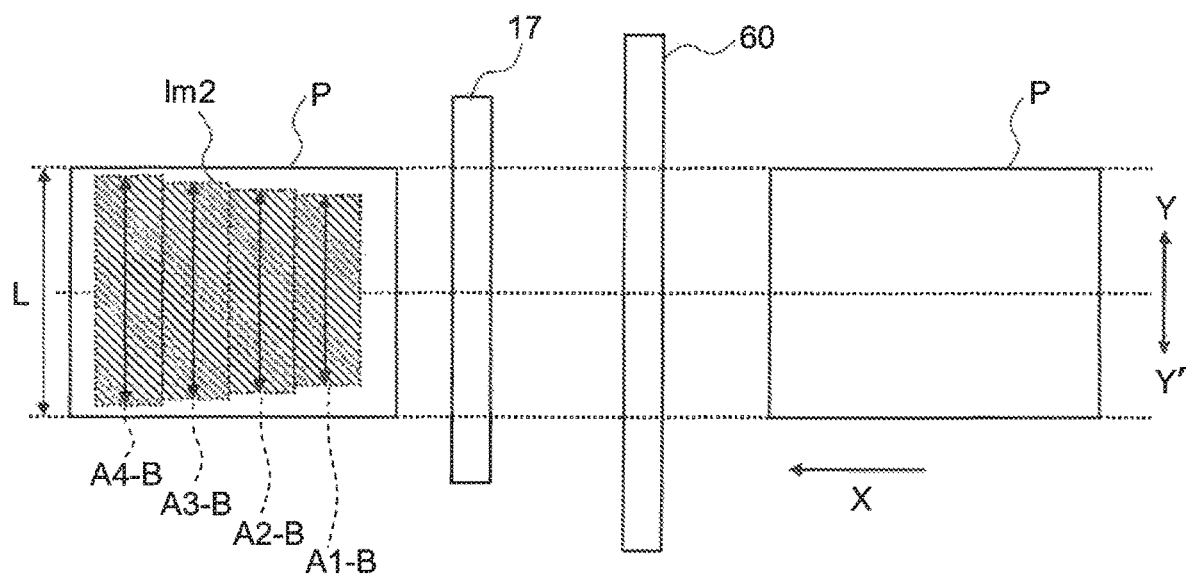
FIG. 16 is a plan view of a state in which second corrected images have been printed on the sheet with the insertion pixel count of interpolation pixels changed in four steps of D1 to D4, as viewed from above.

FIG. 16 is a plan view of a state, as viewed from above, in which second corrected images Im2 have been printed on the sheet P with the interpolation level of interpolation pixels Ip changed in four steps of D1 to D4. Insertion counts and insertion sites of interpolation pixels Ip at D1 to D4 are shown in Table 1.

outside of the sheet P as well as generation of unnecessary margins. It further becomes possible to adjust the insertion pixel count of interpolation pixels Ip simply in short time without using the light-shield plate 67.

Otherwise, the present disclosure is not limited to the above-described embodiment, and may be changed and modified in various ways unless those changes and modifications depart from the gist of the disclosure. For example, the above embodiment has been described on an example employing a transmission-type CIS 60 which is equipped with the sensor elements 60a for receiving laser light from the LED 61. However, as an example, with use of a reflection-type CIS equipped with a light-emitting portion for emitting light to the sheet P to detect reflected light from the sheet P at the sensor elements 60a, edge positions can be determined based on intensity differences between reflected light from the sheet P and reflected light from non-passage areas of the sheet P. In this case, with a view to enhancing intensity differences between reflected light from the sheet P and reflected light from non-passage areas of the sheet P, it is preferable to provide a background member of a color other than the color (white) of the sheet P at a site facing the detection surface of the CIS.

TABLE 1

| Interpolation level | Pixel count | \multicolumn{16}{c}{Sensor block number} | | | | | | | | | | | | | | | |
| --- | --- | --- | --- | --- | --- | --- | --- | --- | --- | --- | --- | --- | --- | --- | --- | --- | --- |
| | | 1 | 2 | 3 | 4 | 5 | 6 | 7 | 8 | 9 | 10 | 11 | 12 | 13 | 14 | 15 | 16 |
| D4 | 8 | ↑ | | ↑ | | ↑ | | ↑ | | ↑ | | ↑ | | ↑ | | ↑ | |
| D3 | 7 | | ↑ | | ↑ | | ↑ | | ↑ | | ↑ | | ↑ | | ↑ | | | |
| | 6 | ↑ | | ↑ | | | ↑ | | | ↑ | | | ↑ | | | ↑ | | |
| D2 | 5 | | ↑ | | | ↑ | | | ↑ | | | ↑ | | | ↑ | | | |
| D1 | 4 | | ↑ | | | | ↑ | | | | ↑ | | | | ↑ | | | |

*1: Arrows show insertion sites of interpolation pixels Ip.
*2: With the pixel count of 6, interpolation pixels Ip cannot be inserted between the sensor blocks.

As shown in FIG. 16, in the case of interpolation level D1 (four pixels) for the interpolation pixels Ip, a second corrected image Im2 of a print width A1-B is printed. Similarly, printing the second corrected image Im2 with the interpolation level changed to D2 (five pixels), D3 (seven pixels), and D4 (eight pixels) allows the second corrected image Im2 of print widths A2-B, A3-B, and A4-B to be printed stepwise.

Margins of the printed second corrected images Im2 are measured by a ruler or the like, and an insertion pixel count of the interpolation pixels Ip that causes the margin to become B/2 (=10 mm) is set as an optimum value. Thus, printing on one sheet P a plurality of second corrected images Im2 with the insertion pixel count of the interpolation pixels Ip changed makes it possible to confirm, by one-time printing, results of having adjusted the insertion pixel count of the interpolation pixels Ip in plural steps. Consequently, an optimum insertion pixel count of the interpolation pixels Ip can be determined in short time, allowing the usage number of sheets P to be reduced.

By virtue of determining the insertion pixel count of interpolation pixels Ip by the above-described second method, it becomes possible to reduce detection errors in widthwise size of the sheet P due to border portions of the individual sensor blocks 60b of the CIS 60. Accordingly, it becomes possible to enhance the accuracy of shaded image data for nozzle selection with the purpose of printing up to widthwise edge proximities of the sheet P. It also becomes possible to effectively suppress ink ejection to widthwise Also, the above embodiment has been described on an example in which the CIS 60 is employed as a sensor for detecting end positions of the sheet P. However, CCD or other sensors other than CIS may also be employed.

The number of ink ejection nozzles 18 of the recording heads 17, their nozzle intervals and the like may be set, as required, in accordance with specifications of the printer 100. Besides, the number of recording heads 17 is not particularly limited and, for example, two or more recording heads 17 may be provided for each of the line heads 11C to 11K.

The above embodiment has been exemplified by the printer 100 of the ink jet recording type equipped with the recording part 9 including the line heads 11C to 11K. However, the disclosure, without being limited to the ink jet recording type, may also be applied similarly to cases in which detection errors of a sheet detection sensor in electrophotographic image forming apparatuses are corrected.

This disclosure is applicable to image forming apparatuses, such as facsimiles, copiers and printers, equipped with a sheet detection sensor for detecting a widthwise position of a sheet. Applying this disclosure makes it implementable to provide an image forming apparatus capable of accurately correcting errors between a detected widthwise size of a sheet and an actual widthwise size of the sheet independently of variations in intervals between sensor blocks constituting the sheet detection sensor.

What is claimed is:

1. An image forming apparatus comprising:
a conveyance part for conveying a sheet:
an image forming part which on a basis of print data, forms an image on the sheet conveyed by the conveyance part;
a sheet detection sensor which is placed on an upstream side of the image forming part in a sheet conveyance direction and which, on a basis of scanning image data formed by reading of the sheet, detects an edge position of the sheet in a sheet width direction perpendicular to the sheet conveyance direction;
a sensor unit including the sheet detection sensor; and
a controller which adjusts an image formation position on the sheet formed by the image forming part on a basis of a difference in the width direction between the edge position detected by the sheet detection sensor and a predetermined reference position, wherein
the sheet detection sensor is configured that a plurality of sensor blocks each with a predetermined reading resolution and with a plurality of sensor elements mounted thereon at specified intervals are arrayed in the sheet width direction,
the controller is enabled to execute a calibration which corrects an error in the sheet detection sensor caused by variations of intervals of the sensor elements at border portions between the plurality of the sensor blocks by inserting interpolation pixels into the scanning image data, and
the controller forms, during execution of the calibration, the scanning image data by reading the sheet by means of the sheet detection sensor with a specified pixel count of the interpolation pixels inserted, and executes, repeatedly with the pixel count changed, image formation using second corrected image data obtained by cutting print image data of an image width A to make the print image data smaller than a width L of the sheet by a distance B, the print image data being obtained by deleting data overlapping with widthwise outer areas of the sheet from print image data formed of a solid image of an image width A'(A<A') larger than the width L of the sheet by using the formed scanning image data, whereby the controller takes, as an optimum value, a pixel count of the interpolation pixels that causes a margin formed in the sheet with the second corrected image printed thereon to become B/2.

2. The image forming apparatus according to claim 1, wherein
the sensor unit includes a light source part which is located opposite the sheet detection sensor with a gap therebetween and lit during execution of the calibration,
the sheet detection sensor is an optical transmission type sensor for detecting light emitted from the light source part, and
the controller reads, with the sheet detection sensor, a light-shield plate having a plurality of light-shield portions with a specified width facing border portions of the sensor blocks during execution of the calibration, then, in the scanning image data of the light-shield plate read, the controller calculates, from a count of pixels corresponding to the light-shield portion read at each border portion of the sensor blocks, a reading error in the count of pixels at each border portion and cumulates the reading error from a center of the scanning image data toward its both ends in the sheet width direction, where the controller inserts, in the scanning image data of the border portion, the interpolation pixels on a one-pixel basis each time the count of cumulated pixels has been incremented by one pixel.

3. The image forming apparatus according to claim 1, wherein the controller forms, during execution of the calibration, the scanning image data by reading the sheet by means of the sheet detection sensor with a specified pixel count of the interpolation pixels inserted, and executes, repeatedly with the pixel count changed, image formation using first corrected image data of an image width A obtained by deleting portions overlapping with widthwise outer areas of the sheet from print image data formed of a solid image of an image width A'(A<A') larger than a width L of the sheet by using the formed scanning image data, whereby the controller takes, as an optimum value, a pixel count of the interpolation pixels that causes a margin formed in the sheet with the first corrected image printed thereon to become 0.

4. The image forming apparatus according to claim 1, wherein
the width L of the sheet, the image width A', and the distance B satisfy a following equation (1) and moreover the distance B is set to a distance smaller than a distance between the sensor elements located at both ends within one of the sensor blocks:

$$B > A' - L \ldots \qquad (1).$$

5. The image forming apparatus according to claim 1, wherein
the controller forms the scanning image data by reading the sheet by means of the sheet detection sensor with an insertion pixel count of the interpolation pixels changed, and executes image formation on a singularity of the sheet by using a plurality of the second corrected images based on the formed plurality of the scanning image data.

6. The image forming apparatus according to claim 1, wherein
the interpolation pixels are inserted, at equal intervals, between the plurality of the sensor blocks composing the sheet detection sensor during printing of the second corrected images.

* * * * *